(12) United States Patent
Hinchliffe et al.

(10) Patent No.: US 11,382,470 B2
(45) Date of Patent: Jul. 12, 2022

(54) FILTER ASSEMBLY

(71) Applicant: Dyson Technology Limited, Wiltshire (GB)

(72) Inventors: Robert Hinchliffe, Bristol (GB); Jeremy William Crouch, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 690 days.

(21) Appl. No.: 16/225,148

(22) Filed: Dec. 19, 2018

(65) Prior Publication Data
US 2019/0183302 A1   Jun. 20, 2019

(30) Foreign Application Priority Data
Dec. 20, 2017   (GB) .................................... 1721394

(51) Int. Cl.
| | | |
|---|---|---|
| *A47L 9/12* | (2006.01) | |
| *A47L 5/24* | (2006.01) | |
| *B01D 46/24* | (2006.01) | |
| *B01D 46/52* | (2006.01) | |
| *B01D 46/64* | (2022.01) | |
| *A47L 9/16* | (2006.01) | |

(52) U.S. Cl.
CPC .................. *A47L 9/12* (2013.01); *A47L 5/24* (2013.01); *A47L 9/125* (2013.01); *A47L 9/127* (2013.01); *A47L 9/1666* (2013.01); *B01D 46/2414* (2013.01); *B01D 46/521* (2013.01); *B01D 46/64* (2022.01); *B01D 2279/55* (2013.01)

(58) Field of Classification Search
CPC ... A47L 9/12; A47L 5/24; A47L 9/125; A47L 9/127; A47L 9/1666; B01D 46/0024; B01D 46/2414; B01D 46/521; B01D 2279/55
See application file for complete search history.

(56) References Cited

U.S. PATENT DOCUMENTS

| | | |
|---|---|---|
| 3,273,194 A | 9/1966 | Jepson |
| 4,627,858 A | 12/1986 | Jacob |
| 6,010,561 A | 1/2000 | Dyson |
| 6,289,553 B1 | 9/2001 | Dyson |
| 6,341,404 B1 | 1/2002 | Salo et al. |
| 7,284,298 B2 | 10/2007 | Stein |
| 8,161,599 B2 | 4/2012 | Griffith et al. |

(Continued)

FOREIGN PATENT DOCUMENTS

| | | |
|---|---|---|
| CA | 2658006 A1 | 9/2010 |
| CN | 1593319 A | 3/2005 |

(Continued)

OTHER PUBLICATIONS

Decision of Rejection dated Dec. 7, 2020, directed to JP Application No. 2018-237237; 12 pages.

(Continued)

*Primary Examiner* — Andrew A Horton
(74) *Attorney, Agent, or Firm* — Faegre Drinker Biddle & Reath LLP

(57) ABSTRACT

A filter assembly includes a filter housing, a first filter, and a second filter, wherein the first filter is a pre-motor filter, and the second filter is a post-motor filter, and both the first and second filters are fixed to the filter housing and are annular about a common axis.

21 Claims, 3 Drawing Sheets

(56) References Cited

U.S. PATENT DOCUMENTS

| | | |
|---|---|---|
| 2002/0092123 A1 | 7/2002 | Stephens |
| 2003/0159411 A1* | 8/2003 | Hansen .................. A47L 9/127 55/337 |
| 2005/0039426 A1 | 2/2005 | Genn |
| 2008/0178420 A1 | 7/2008 | Conrad |
| 2008/0256744 A1 | 10/2008 | Rowntreer |
| 2009/0106932 A1 | 4/2009 | Courtney |
| 2010/0132155 A1 | 6/2010 | Brough |
| 2010/0229323 A1* | 9/2010 | Conrad ................... A47L 5/24 15/344 |
| 2010/0229327 A1 | 9/2010 | Conrad |
| 2011/0219577 A1 | 9/2011 | Conrad |
| 2015/0026915 A1* | 1/2015 | Conrad .................. A47L 9/127 15/328 |
| 2016/0249777 A1 | 9/2016 | Harries |
| 2017/0196419 A1* | 7/2017 | Brown .................. A47L 9/1608 |
| 2017/0280950 A1 | 10/2017 | Nam et al. |
| 2017/0332860 A1 | 11/2017 | Nam |
| 2020/0329929 A1 | 10/2020 | Nam |

FOREIGN PATENT DOCUMENTS

| | | |
|---|---|---|
| CN | 1630481 A | 6/2005 |
| CN | 101288572 A | 10/2008 |
| CN | 101455540 A | 6/2009 |
| CN | 101657133 A | 2/2010 |
| CN | 101744567 A | 6/2010 |
| CN | 101897558 A | 12/2010 |
| CN | 102188209 A | 9/2011 |
| CN | 205072782 U | 3/2016 |
| CN | 105828682 A | 8/2016 |
| EP | 2191762 | 6/2010 |
| GB | 2468153 A | 9/2010 |
| JP | S56-23050 U | 7/1979 |
| JP | S57-12214 U | 6/1980 |
| JP | H7-512 U | 1/1995 |
| JP | 2004-510452 A | 4/2004 |
| JP | 2010-201168 A | 9/2010 |
| WO | 99/30602 | 6/1999 |
| WO | 99/30604 | 6/1999 |
| WO | 2017/171496 A1 | 10/2017 |

OTHER PUBLICATIONS

Notice of Reasons for Rejection dated Mar. 2, 2020, directed to JP Application No. 2018-237237; 15 pages.

The First Office Action dated Nov. 3, 2020, directed to CN Application No. 201811552760.8; 19 pages.

Search Report dated Jun. 14, 2018, directed to GB Application No. 1721394.3; 1 page.

International Search Report and Written Opinion dated Jan. 4, 2019, directed to International Application No. PCT/GB2018/053142; 11 pages.

Third Office Action and Search Report received for Chinese Patent Application No. 201811552760.8, dated Sep. 15, 2021, 15 pages (9 pages of English Translation and 6 pages of Original Document).

* cited by examiner

FILTER ASSEMBLY

REFERENCE TO RELATED APPLICATIONS

This application claims priority of United Kingdom Application No. 1721394.3, filed Dec. 20, 2017, the entire contents of which are incorporated herein by reference.

FIELD OF THE INVENTION

The present invention relates to a filter assembly.

BACKGROUND OF THE INVENTION

Filters are key components in products containing motors, and particularly motors which generate a flow of fluid through the product such as vacuum cleaners. Without filters, dirt and debris can enter the motor, reducing its efficiency and performance overtime. In addition, motors themselves can produce emissions in the form of particles which may be undesirable to be released into the atmosphere.

However, the addition of filters to a product can impact the size of the product, particularly if more than one filter is required in order to filter both upstream and downstream of a motor. In addition, filters typically require maintenance by a user, whether that be replacement or removal for cleaning, and multiple filters to maintain can lead to frustration for a user.

Therefore there is a need for improvements to be made to filters that can go some way to alleviate these problems.

SUMMARY OF THE INVENTION

A first aspect of the present invention provides a filter assembly comprising: a filter housing; a first filter; and a second filter, wherein the first filter is a pre-motor filter, and the second filter is a post-motor filter, and both the first and second filters are fixed to the filter housing and are annular about a common axis.

By combining both the pre-motor and post-motor filters into a single assembly, a more compact and convenient motor filter assembly can be achieved. Furthermore, a user is able to handle and interact with both filters simultaneously. For example, removing, replacing, washing or cleaning both the filters can be done in a single action instead of the user having to do so for each filter individually. In addition, the annular shape of the filters provides a particularly efficient use of space, whereby a motor can be positioned at least partially within the annular shape defined by the filters.

The cross-sectional shape of one or both of the first and second filters may be one of circular, elliptical or obround. Motors tend to have a generally cylindrical shape, and providing the filters with a cross sectional shape that substantially matches that of the outside of the motor or motor housing, a particularly space-efficient filter can be achieved.

The first filter may be adjacent the second filter in a direction along the common axis. As a result, the filter surface area can be maximised while keeping the overall size of the filter assembly to a minimum.

The filter housing may comprise an exposed portion and an enclosed portion. The exposed portion of the filter housing may comprise a frame extending from the enclosed portion, the first filter being positioned around the frame. The enclosed portion of the filter housing may comprise an outer casing, and the second filter may be positioned inside the outer casing.

As a result the exposed portion allows for efficient fluid flow to and around the pre-motor filter, which can allow even-loading of the flow around the filter. The enclosed portion allows a part of the filter assembly to remain enclosed such that a user can hygienically handle the filter assembly by the enclosed portion without getting filtered dirt or dust on their hands.

The outer casing may have vent holes. As a result, fluid flowing through the post-motor filter is able to exit the enclosed portion of the filter housing.

The first filter may comprise a layered filter medium, and the second filter may be a pleated filter.

The filter housing may comprise an annular seal between the first and second filters. As a result, the seal can ensure that there is no fluid leakage around the housing between the pre- and post-motor filters. Any such fluid leakage around the housing could reduce the performance of a motor positioned within the filter assembly.

The flow direction for the first filter may be opposite to the flow direction for the second filter. As a result, there is an efficient fluid flow through the filter assembly which minimises any changes of direction for the fluid flow, which can have a negative impact on efficiency and performance of a machine.

The flow direction for the first filter may be radially inwards towards the common axis, and the flow direction for the second filter may be radially outwards away from the common axis. As a result, the filter assembly can conveniently be positioned around a motor positioned along the common axis, maximising the use of space, while providing efficient filtration of fluid flowing into and out of the motor.

A second aspect of the present invention provides a product comprising a motor, and the filter assembly described in any one of the previous statements, wherein the filter assembly at least partially overlaps with the motor in a direction along the common axis.

As a result the filter assembly surrounds the motor in a particularly space efficient arrangement. This helps to minimise the overall size of the product.

The filter assembly may be positioned around the motor such that the first filter is positioned around an inlet to the motor, and the second filter is positioned around an outlet of the motor. As a result, fluid passes through the pre-motor filter directly into the inlet to the motor, and air leaving the motor passes directly through the post-motor filter.

The motor may be housed in a cylindrical motor bucket having a motor bucket inlet and a motor bucket outlet, the filter assembly being positioned around the motor bucket and being removable from the product by sliding the filter assembly over the motor bucket along the direction of the common axis. As a result, the filter assembly can be quickly and easily removed from the motor bucket, and maintenance of the filters is more convenient for a user.

The motor bucket inlet may comprise a plurality of through-holes aligned with the inlet of the motor, and the motor bucket outlet may comprise a plurality of through-holes aligned with the outlet of the motor. As a result, the through holes allow fluid to flow easily through the motor bucket, without unnecessarily compromising the structural integrity of the motor bucket.

The filter housing may comprise an annular seal between the first and second filters, the annular seal being in sealing contact with a solid central portion of the motor bucket between the motor bucket inlet and motor bucket outlet. As a result, the seal can ensure that there is no fluid leakage around the housing between the motor bucket inlet and motor bucket outlet. Any such fluid leakage around the housing could reduce the performance of the motor, and as a result the performance of the product.

The product may be a vacuum cleaner.

At least part of the filter assembly may form at least part of an outer surface of the product. As a result, the filter assembly can be easily accessed by a user, and filter maintenance is made easier.

The filter housing may comprise an enclosed portion comprising an outer casing, and it may be the outer casing that forms at least part of an outer surface of the product.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
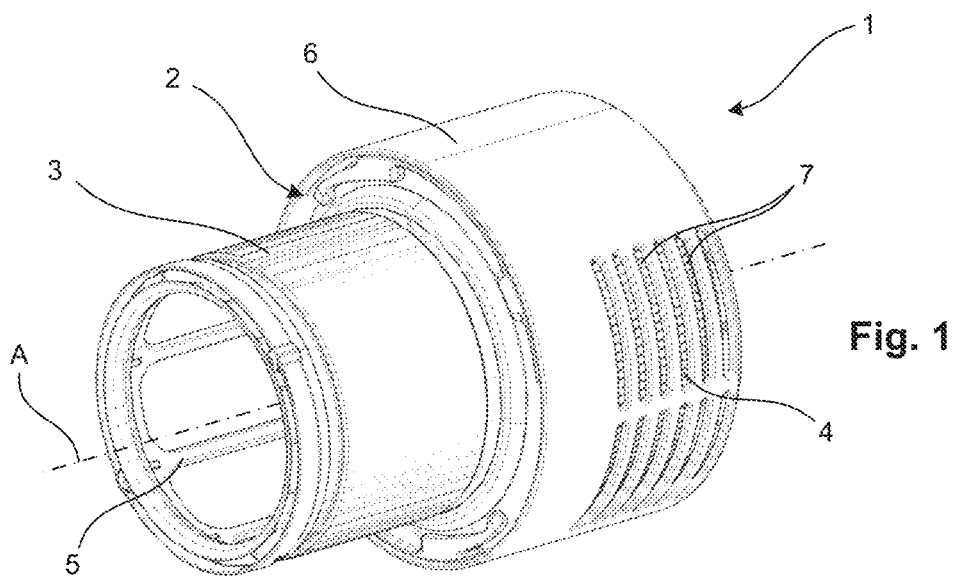
FIG. 1 is a filter assembly.
Figure 2:
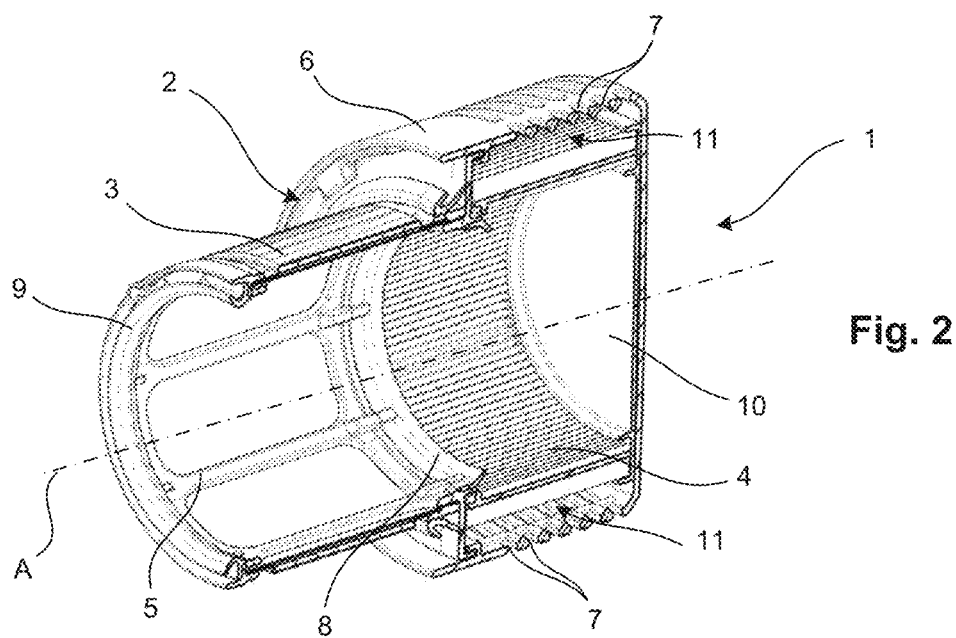
FIG. 2 is a cross section through the filter assembly of FIG. 1.
Figure 3:
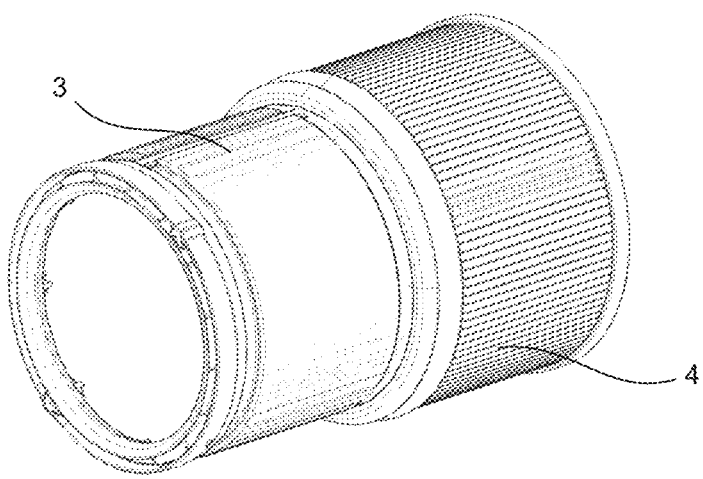
FIG. 3 shows a partially assembled filter assembly.

FIG. 1 shows a filter assembly 1, and FIG. 2 shows a cross section through the same filter assembly 1. FIG. 3 shows part of the filter assembly 1 where some components are not shown. The filter assembly 1 comprises a filter housing 2 to which are fixed two filters: a pre-motor filter 3, and a post-motor filter 4. The pre-motor filter 3 and the post-motor filter are both annular in shape, and are both annular about a common axis A. The pre-motor filter 3 is positioned adjacent the post-motor filter 4, with little separating the two so as to minimise the overall size of the filter assembly 1.

The pre-motor filter 3 can be formed of any suitable filter material, or combination of materials, typically found in pre-motor filters. In the present embodiment the pre-motor filter 3 comprises layers of filter media including a layer of scrim or web material, a non-woven filter medium such as fleece, followed by a further layer of scrim or web material. An electrostatic filter medium could also be included if desired. The post-motor filter 4 can similarly be formed of any suitable filter material, or combination of materials, typically found in post-motor filters. In the present embodiment, the post-motor filter 4 is formed of a pleated HEPA-standard (high efficiency particulate air) filter medium.

The filter housing consists of two identifiably distinct areas, an exposed portion and an enclosed portion. The exposed portion of the filter housing 2 has a frame 5 which extends from the enclosed portion of the filter housing 2. The pre-motor filter 3 is positioned around the frame 5 of the exposed portion of the frame 5. The frame 5 acts to support the pre-motor filter 3 such that it maintains its annular shame when the filter assembly 1 is in use. The enclosed portion of the filter housing 2 has an outer casing 6 (not shown in FIG. 3), and the post-motor filter 4 is fixed inside the outer casing 6. The outer casing has a number of vent holes 7, or apertures, through which fluid such as air is able to flow and, as such, the vent holes 7 act as the outlet of the filter assembly 1. In FIG. 1, the post-motor filter 4 is partially visible through the vent holes 7 in the outer casing 6 of the filter housing 2.

The filter housing 2 also comprises an annular seal 8 positioned between the pre-motor filter 3 and the post-motor filter 4 inside the filter assembly 1. A further annular seal 9 is provided at one end of the filter housing at the opposite end of the pre-motor filter 3 from the post-motor filter 4. The annular seals 8 and 9 act to seal with a motor assembly when the filter assembly 1 is use and the function of the annular seals 8 and 9 will explained in more detail later, in particular with reference to FIG. 6.

The outer casing 6 has a solid end wall 10, and the post-motor filter 4 is fixed inside the outer casing 6 in a position such that an annular cavity 11 is defined between the post-motor filter 4 and the outer casing 6. The annular cavity may simply be a void, as shown in the FIG. 2, or the annular cavity could be used to house another material such as.

Figure 4:
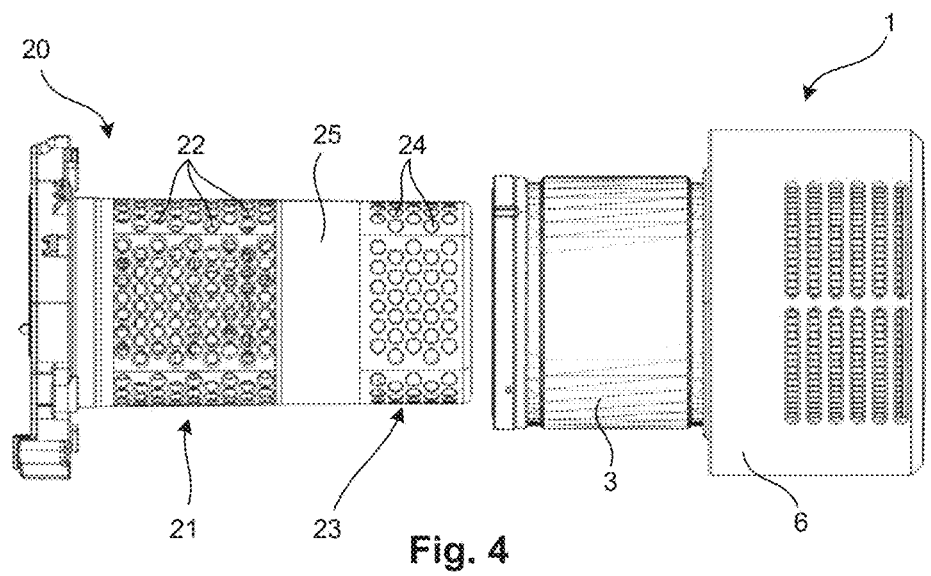
FIG. 4 shows a motor assembly and the filter assembly of FIG. 1.
Figure 5:
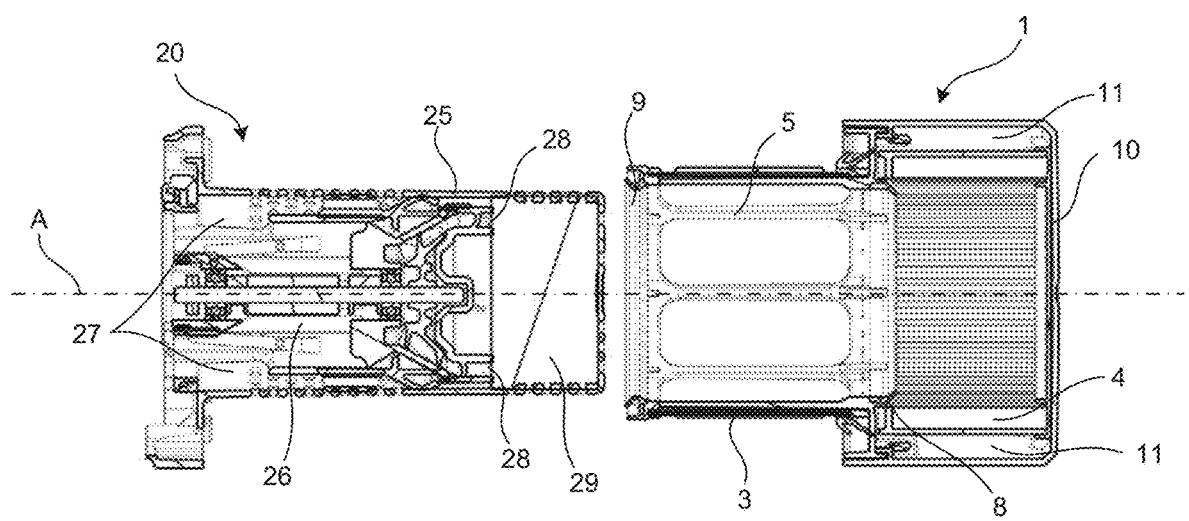
FIG. 5 shows a cross section through the motor and filter assemblies of FIG. 4.
Figure 6:
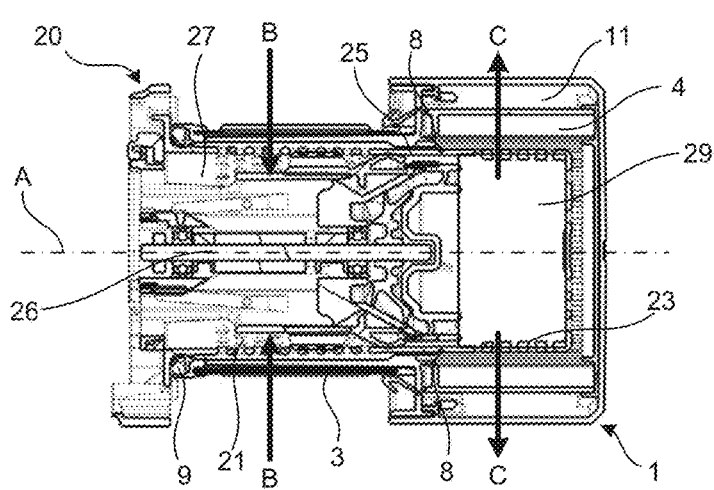
FIG. 6 shows the assemblies of FIG. 5, with the filter assembly assembled in place around the motor assembly.

FIG. 4 shows the filter assembly 1 and a motor assembly comprising a motor bucket 20, and FIG. 5 shows a cross section through the filter assembly 1 and motor assembly of FIG. 4. FIG. 6 shows the assemblies of FIG. 5, with the filter assembly 1 assembled in place around the motor assembly.

The motor assembly comprises a motor bucket 20 having a motor bucket inlet 21 comprising a plurality of through-holes 22 acting as an inlet to a motor, and a motor bucket outlet 23 comprising a plurality of similar through-holes 24 acting as an outlet from a motor. A central portion 25 of the motor bucket separates the motor bucket inlet 21 and motor bucket outlet 23.

The motor 26 is located inside the motor bucket 20. The motor inlet 27 is aligned with the motor bucket inlet 21, and the motor outlet 28 is aligned with the motor bucket outlet 23. A cavity 29 between the motor outlet 28 and the motor bucket outlet 23 can house, for example, an open cell acoustic foam in order to provide further acoustic dampening benefits.

Whilst FIGS. 5 and 6 show the filter assembly 1 separated from the motor assembly, FIG. 6 shows the filter assembly in position around the motor assembly. The annular shape of the pre-motor filter 3 and post-motor filter 4 allows the filter assembly 1 to fit over the motor bucket 20 such that it over overlaps with the motor 26 in a direction along the common axis A. The filter assembly 1 is therefore positioned around the motor 26, with the pre-motor filter 3 is positioned around the motor bucket inlet 21, and the post-motor filter 4 positioned around the motor bucket outlet 23. The filter assembly 1 is removable and replaceable over the motor assembly by sliding the filter assembly 1 over the motor bucket 20 along the direction of the common axis 20.

During operation, the motor 26 creates a fluid flow and draws fluid such as air through the pre-motor filter 3 as indicated by the arrow B, the fluid then flows into the motor bucket 20 via the through-holes 22 in the motor bucket inlet 21, and through the motor 26. After the fluid exits the motor outlet 28, it passes back out of the motor bucket 20 via the through-holes 24 in the motor bucket outlet 23, through the post-motor filter 4, before exiting the filter assembly 1 via the vent holes 7 in the outer casing 6, as represented by arrow C. As is evident from FIG. 6, the fluid directions into and out from the filter assembly 1, represented by arrows B and C respectively, are opposite to each other. The flow direction for the pre-motor filter 3 is radially inwards in a direction towards the common axis A, and the flow direction for the post-motor filter 4 is radially outwards in a direction away from the common axis A.

The annular seal 8 seals against the central portion 25 of the motor bucket 20 such that any fluid flow within the filter assembly 1 between the inlet and the outlet is prohibited. The further annular seal 9 seals with another part of the motor bucket 20 on the opposite side of the motor bucket inlet 21 to the annular seal 8. The annular seals 8 and 9 therefore seal the filter assembly 1 on each side of the motor bucket inlet 21 to ensure that no fluid is able to leak around the filter assembly 1 which could reduce the performance and efficiency of the motor 26, and any product containing the motor 26.

Figure 7:
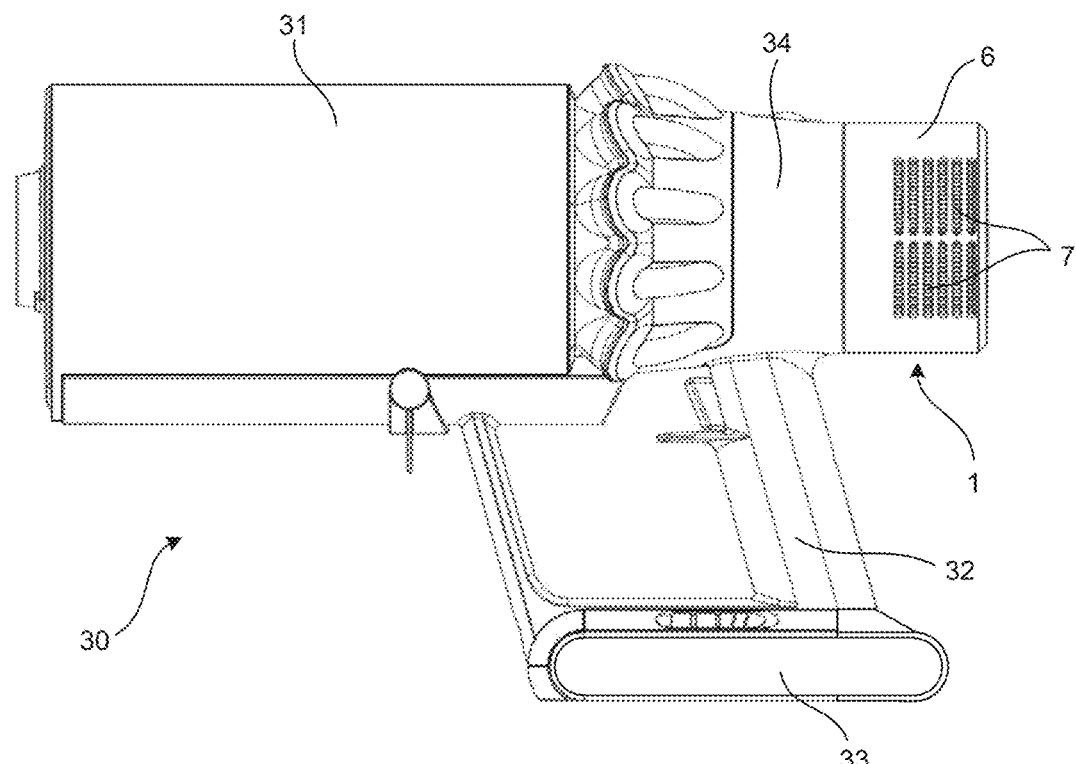
FIG. 7 shows a vacuum cleaner comprising the filter assembly of the previous figures.

FIG. 7 shows a vacuum cleaner 30 comprising the filter assembly 1 of the previous Figures. The vacuum cleaner 30 is of the handheld type, although the filter assembly is not limited for use with handheld vacuum cleaners, and could be used in any product requiring pre- and post-motor filters. The vacuum cleaner 30 has a dirt separator 31, a handle 32, a power source in the form of a battery pack 33, and a main housing 34. The dirt separator 31 separates dirt from a dirt-laden airflow that is drawn into the vacuum cleaner by a motor housed within the main housing 34, and powered by the battery pack 33. After passing through the motor, cleaned air is expelled through the vent holes 7 in the outer casing 6 of the filter assembly 1.

The outer casing 6 of the filter assembly 1 forms part of the outer surface of the product. This makes it easy for a user to handle the filter assembly, for example during maintenance of the filter assembly when the user may be required to remove the filter assembly from the vacuum cleaner. In addition, the air (or other fluid) leaving the filter assembly is expelled directly into the atmosphere, and no additional ducting is required.

Figure 8:
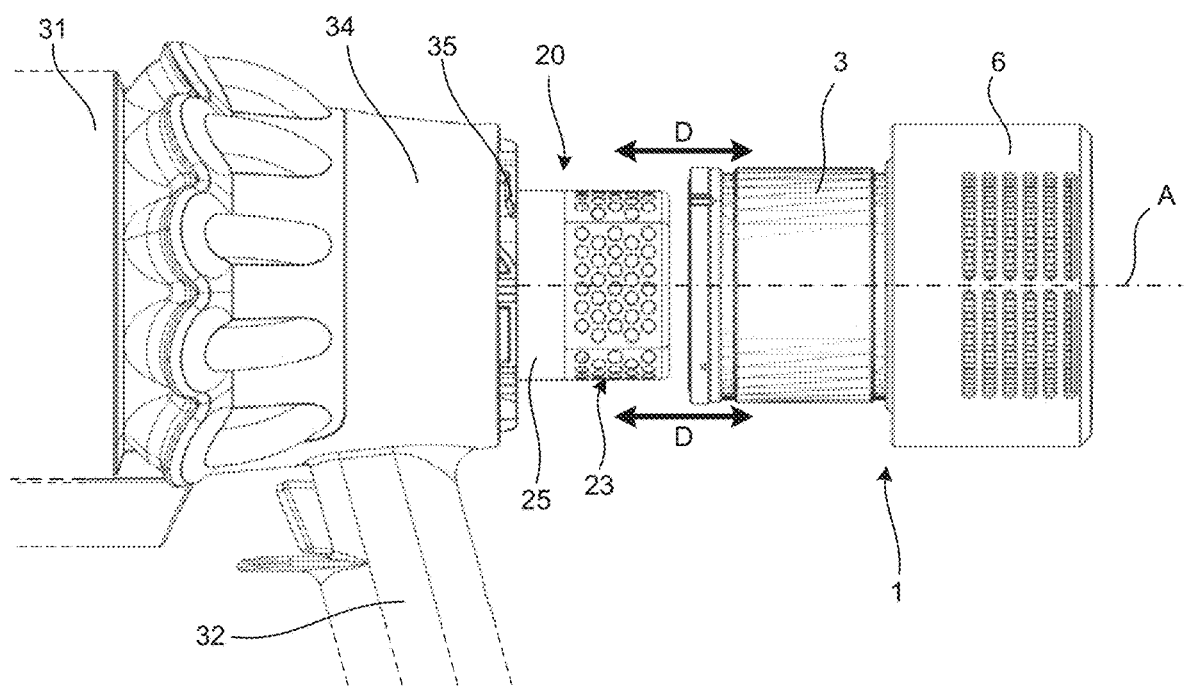
FIG. 8 shows part of the vacuum cleaner of FIG. 7 during removal and reinstallation of the filter assembly.

FIG. 8 shows removal and/or replacement of the filter assembly 1 from the vacuum cleaner 30 of FIG. 7. As indicated by the double arrows D, the filter housing 1 is removed from, and subsequently reassembled onto, the vacuum cleaner by sliding the filter assembly over the motor bucket 20 along the direction of the common axis A. The motor bucket outlet 23 can be seen in FIG. 8, but the motor bucket inlet is positioned inside the main housing 34. The main housing 34 has an annular recess around the motor bucket 20 such that the exposed portion of the filter assembly 1, which comprises the pre-motor filter 3, is able to slide inside the main housing 34 into position around the motor bucket inlet.

A catch 35, or other temporary fixing means, is provided on the main body 34 of the vacuum cleaner 30 to lock the filter assembly 1 in place to prevent it from sliding off while the vacuum cleaner 30 is in use. There is a corresponding engagement member on the filter housing of the filter assembly (not shown) which engages with the catch 35 on the main body 34. Rotation of the filter assembly 1 is required to engage the engagement member with the catch. Alternative temporary fixing means could be used instead of the catch 35. For example, the filter assembly 1 could be held in place on the vacuum cleaner 30 by way of a magnetic engagement.

Whilst particular embodiments have thus far been described, it will be understood that various modifications may be made without departing from the scope of the invention as defined by the claims.

For example, in the embodiments described above, the pre- and post-motor filters have a circular cross-sectional shape. However, in alternative embodiments, other cross-sectional shapes may be adopted whist maintaining the annular shape around a common axis. For example, the cross-sectional shape of the pre- and post-motor filters may be elliptical, obround, square or rectangular. Furthermore, whilst the embodiments described above all show the pre-motor filter and the post-motor filter both having the same cross-sectional shape, it will be understood that in alternative embodiments, the pre-motor filter may have a different cross-sectional shape to the post-motor filter. The shapes of the pre-motor filter and post-motor filter, and as such the filter assembly in which they are housed, can therefore be adapted to the requirements of the vacuum cleaner in which they are being used.

The invention claimed is:

1. A filter assembly comprising:
a filter housing;
a first filter that is annular and forms a first interior cavity; and
a second filter that is annular and forms a second interior cavity,
wherein the first filter is a pre-motor filter, and the second filter is a post-motor filter, and both the first and second filters are fixed to the filter housing and are annular about a common axis, and
wherein the filter housing comprises a frame extending within the first interior cavity.

2. The filter assembly of claim 1, wherein the cross-sectional shape of one or both of the first and second filters is one of circular, elliptical or obround.

3. The filter assembly of claim 1, wherein the first filter is adjacent the second filter in a direction along the common axis.

4. The filter assembly of claim 1, wherein the filter housing comprises an exposed portion and an enclosed portion.

5. The filter assembly of claim 4, wherein the exposed portion of the filter housing comprises the frame extending from the enclosed portion, the first filter being positioned around the frame.

6. The filter assembly of claim 4, wherein the enclosed portion of the filter housing comprises an outer casing, and the second filter is positioned inside the outer casing.

7. The filter assembly of claim 6, wherein the outer casing has vent holes.

8. The filter assembly of claim 1, wherein the first filter comprises a layered filter medium.

9. The filter assembly of claim 1, wherein the second filter is a pleated filter.

10. The filter assembly of claim 1, wherein the filter housing comprises an annular seal between the first and second filters.

11. The filter assembly of claim 1, wherein the flow direction for the first filter is opposite to the flow direction for the second filter.

12. The filter assembly of claim 11, wherein the flow direction for the first filter is radially inwards towards the common axis, and the flow direction for the second filter is radially outwards away from the common axis.

13. An apparatus comprising:
a motor assembly comprising a motor; and
a filter assembly that comprises:
a filter housing,
a first filter, and
a second filter, wherein the first filter is a pre-motor filter, and the second filter is a post-motor filter, and both the first and second filters are fixed to the filter housing and are annular about a common axis, wherein the filter assembly at least partially overlaps the motor in a direction along the common axis, and wherein the filter assembly is removable from, and replaceable on, the apparatus by sliding the filter assembly over the motor assembly along the direction of the common axis.

14. The apparatus of claim 13, wherein the filter assembly is positioned around the motor such that the first filter is positioned around an inlet to the motor, and the second filter is positioned around an outlet of the motor.

15. The apparatus of claim 14, wherein the motor assembly further comprises a cylindrical motor bucket, the motor being housed in the cylindrical motor bucket having a motor bucket inlet and a motor bucket outlet, the filter assembly is positioned around the motor bucket and is removable from the apparatus by sliding the filter assembly over the motor bucket along the direction of the common axis.

16. The apparatus of claim 15, wherein the motor bucket inlet comprises a plurality of through-holes aligned with the inlet of the motor, and the motor bucket outlet comprises a plurality of through-holes aligned with the outlet of the motor.

17. The apparatus of claim 15, wherein the filter housing comprises an annular seal between the first and second filters, and the annular seal is in sealing contact with a solid central portion of the motor bucket between the motor bucket inlet and motor bucket outlet.

18. The apparatus of claim 13, wherein the apparatus is a vacuum cleaner.

19. The apparatus of claim 13, wherein at least part of the filter assembly forms at least part of an outer surface of the apparatus.

20. The apparatus of claim 19, wherein the filter housing comprises an enclosed portion comprising an outer casing, and it is the outer casing that forms at least part of an outer surface of the apparatus.

21. A filter assembly for removal from and replacement on a product, the product comprising a motor assembly having a motor, and the filter assembly comprising:
 a filter housing;
 a first filter; and
 a second filter,
 wherein the first filter is a pre-motor filter, and the second filter is a post-motor filter, and both the first and second filters are fixed to the filter housing and are annular about a common axis to permit sliding of the filter assembly over the motor assembly along the direction of the common axis.

* * * * *